Figure 1:
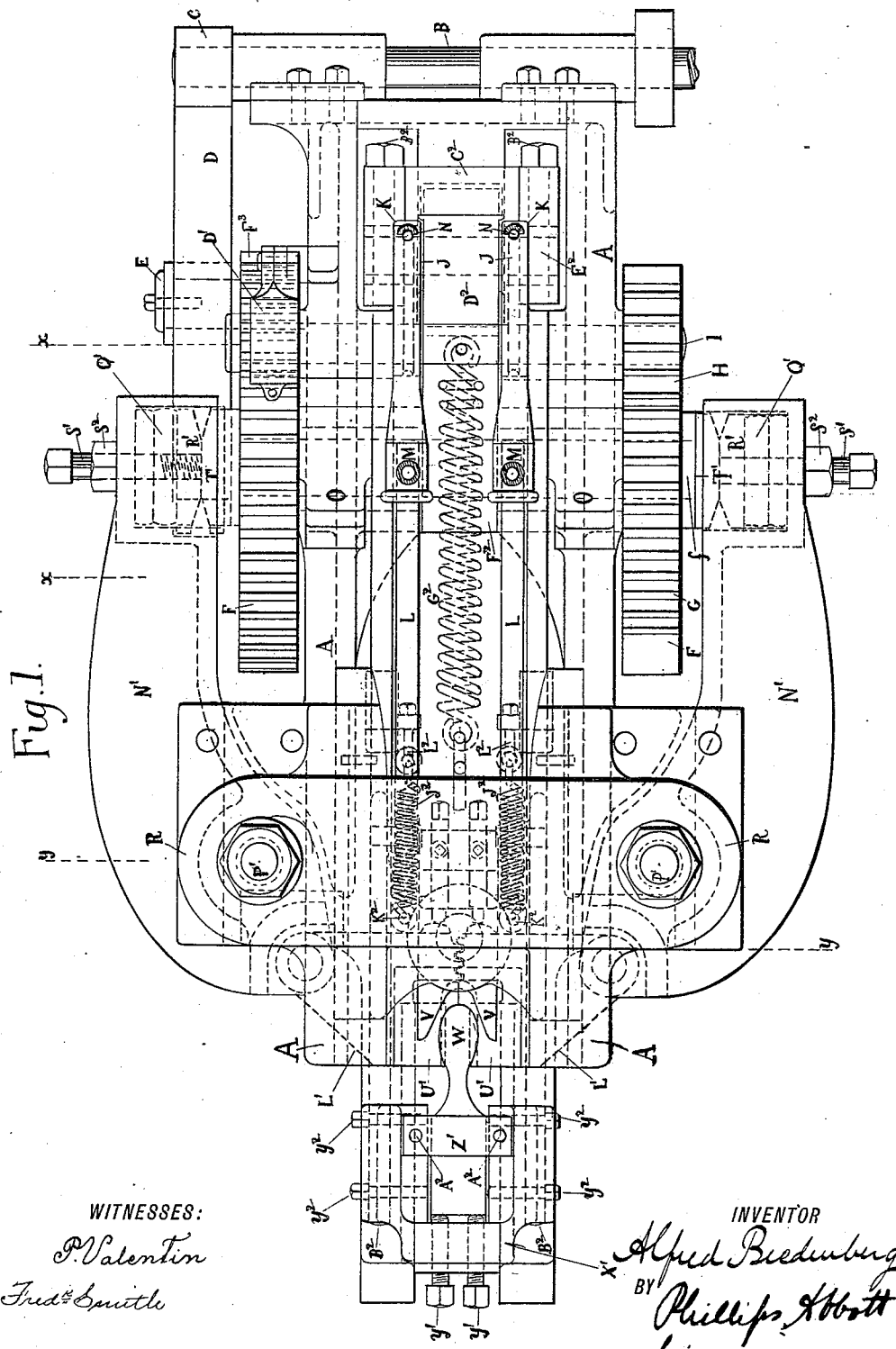

(No Model.)

5 Sheets—Sheet 1.

A. BREDENBERG.
SHOE COUNTER MACHINE.

No. 464,449.

Patented Dec. 1, 1891.

WITNESSES:
P. Valentin
Fred. Smith

INVENTOR
Alfred Bredenberg
BY Phillips Abbott
his ATTORNEY.

(No Model.) 5 Sheets—Sheet 2.

A. BREDENBERG.
SHOE COUNTER MACHINE.

No. 464,449. Patented Dec. 1, 1891.

Witnesses:
H. S. McArthur
E. L. Thrasher

Inventor:
A. Bredenberg
by Foster Freeman
atty (No Model.) 5 Sheets—Sheet 3.

A. BREDENBERG.
SHOE COUNTER MACHINE.

No. 464,449. Patented Dec. 1, 1891.

WITNESSES:
P. Valentin
Fred Smith

INVENTOR
Alfred Bredenberg
BY
Phillips Abbott
his ATTORNEY.

(No Model.)  5 Sheets—Sheet 4.
A. BREDENBERG.
SHOE COUNTER MACHINE.
No. 464,449. Patented Dec. 1, 1891.
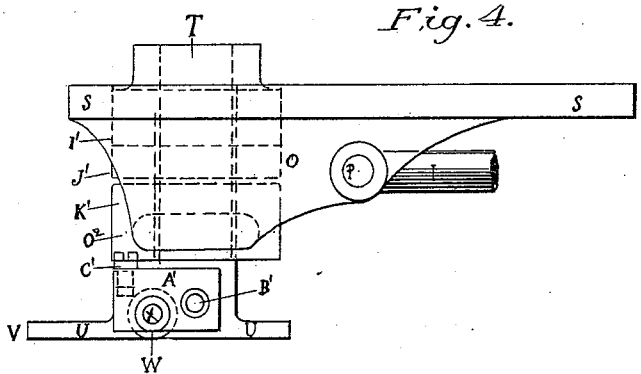
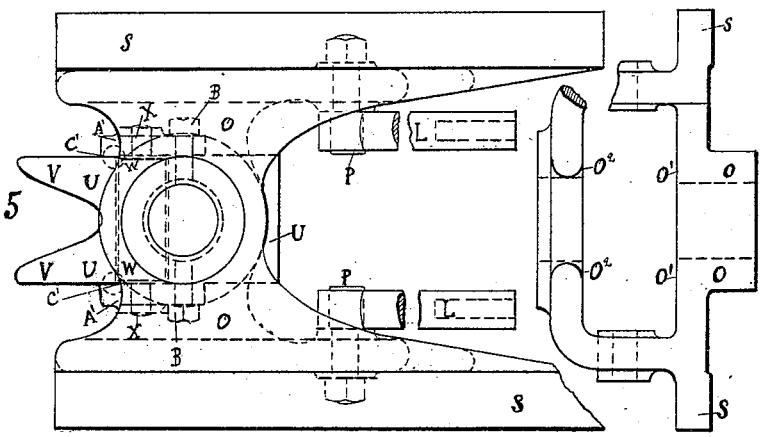
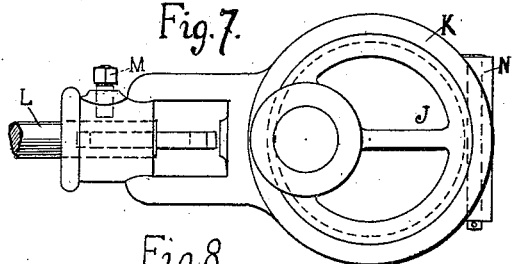
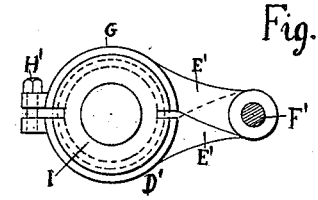
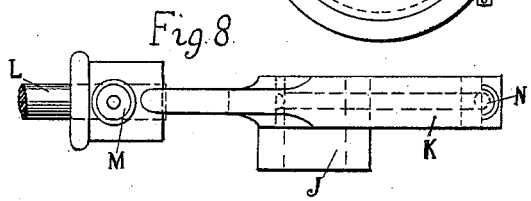
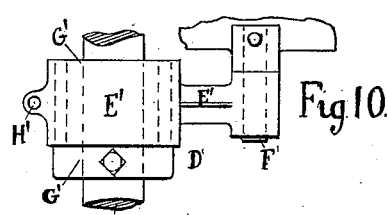
WITNESSES:
P. Valentin
Fredk Smith
INVENTOR
Alfred Bredenberg
BY
Phillips Abbott
his ATTORNEY.

(No Model.) A. BREDENBERG. 5 Sheets—Sheet 5.
SHOE COUNTER MACHINE.
No. 464,449. Patented Dec. 1, 1891.
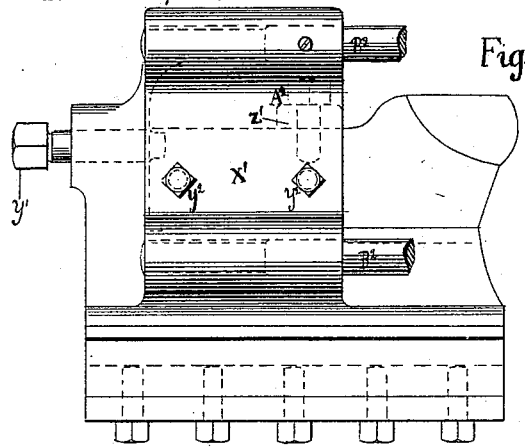
Fig. 11.
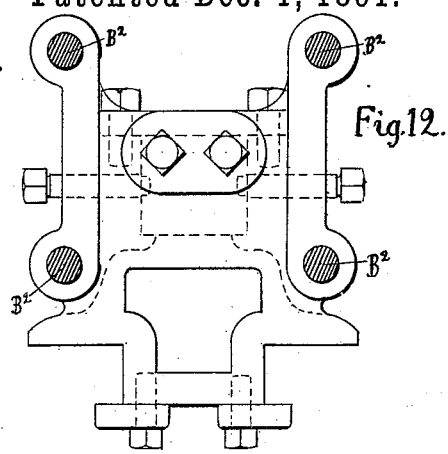
Fig. 12.
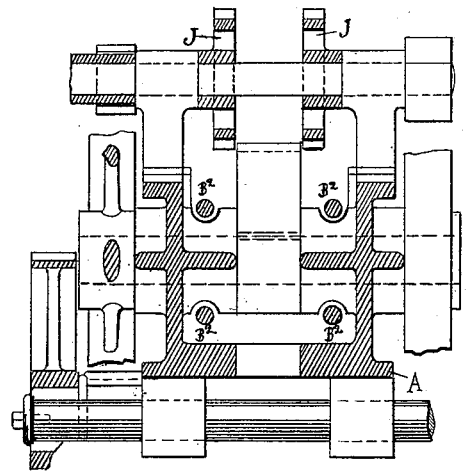
Fig. 13.
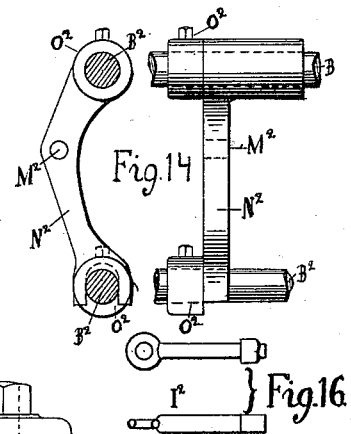
Fig. 14.
Fig. 16.
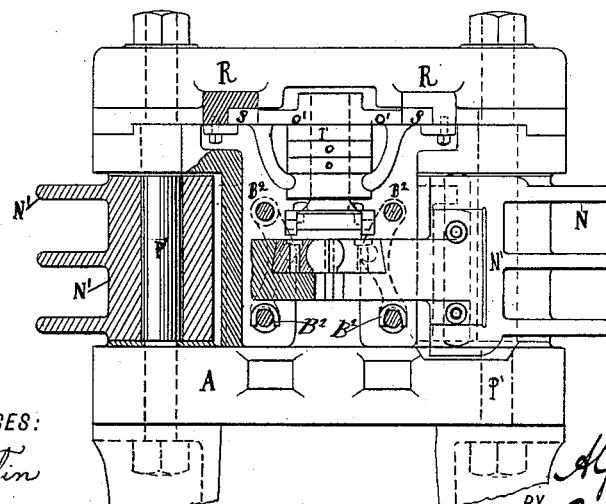
Fig. 15.
WITNESSES:
P. Valentin
Fred. Smith
INVENTOR
Alfred Bredenberg
BY Phillips Abbott
his ATTORNEY.

UNITED STATES PATENT OFFICE.

ALFRED BREDENBERG, OF BROOKLYN, NEW YORK, ASSIGNOR TO GEORGE W. HILL, OF SAME PLACE.

SHOE-COUNTER MACHINE.

SPECIFICATION forming part of Letters Patent No. 464,449, dated December 1, 1891.

Application filed October 17, 1889. Serial No. 327,388. (No model.)

*To all whom it may concern:*

Be it known that I, ALFRED BREDENBERG, a citizen of the United States, and a resident of Brooklyn, in the county of Kings and State of New York, have invented certain new and useful Improvements in Shoe-Counter Machines, of which the following is a specification.

My invention relates to improvements in machines for forming shoe-counters; and it consists in improvements in the construction and operation of the squeezing and forming dies; also in the cushions whereby excessive strain is taken off from the squeezing-dies and other parts of the machine; also to improved means for rubbing down the edges of the counters; also peculiarly-constructed cushions for the rubbing-down devices, whereby their tension or resistance may be adjusted at will, and also in the general construction and operation of the machine throughout, whereby adjustability, partial automaticity, and greater accuracy in operation result and comparatively small cost and compactness in structure are secured.

In the drawings the same reference-letters indicate the same parts in all the figures.

Figure 2:
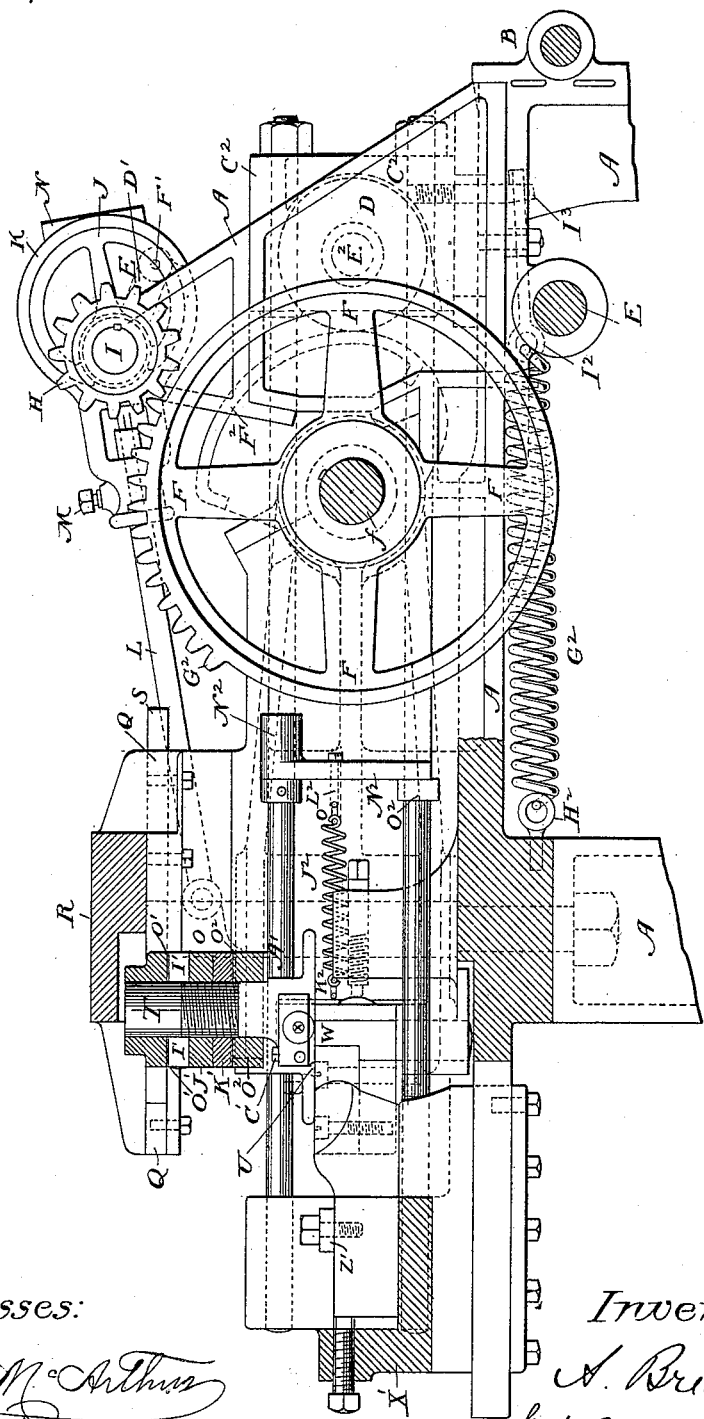
Figure 3:
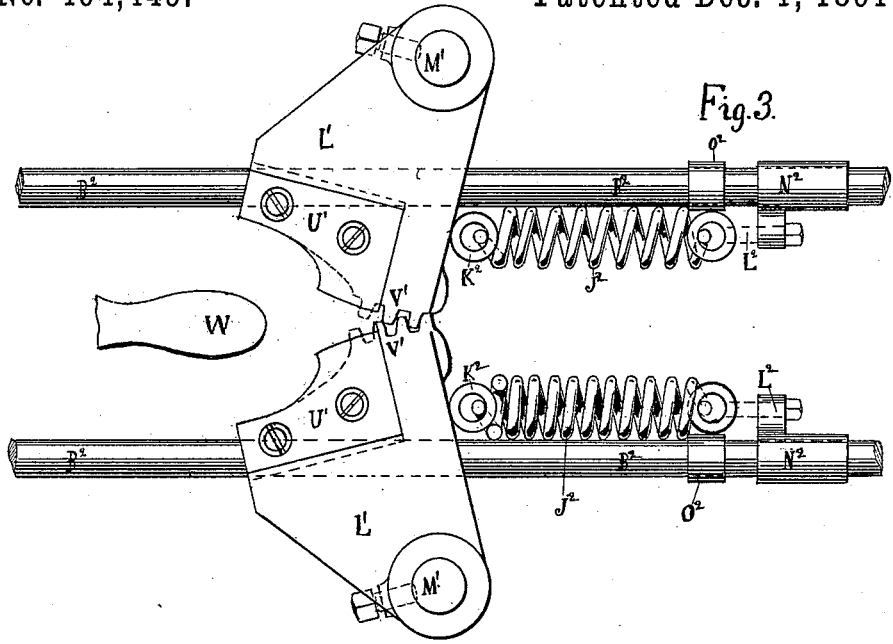
Figures 17, 18:
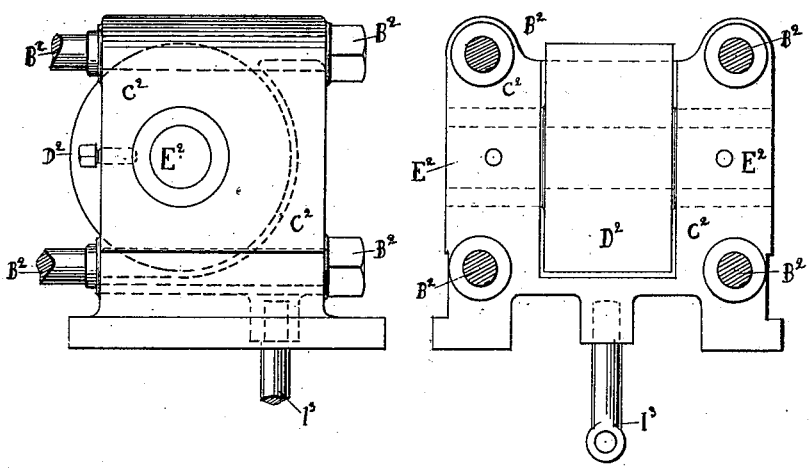

Figure 1 illustrates a plan view of the machine. Fig. 2 illustrates a longitudinal vertical section of the machine. Fig. 3 illustrates a top view of the dies for forming the counters. Fig. 4 illustrates a side view of the rubbing-down device and its slide. Fig. 5 illustrates a top view of the devices shown in Fig. 4. Fig. 6 illustrates an end view of the sliding frame which carries the rubbing-down device. Fig. 7 illustrates a side view of the eccentric which actuates the rubbing-down device shown specially in Figs. 4, 5, and 6. Fig. 8 illustrates an edge or top view of the parts shown in Fig. 7. Fig. 9 illustrates a side view of a friction attachment which is applied to the eccentric shown specially in Figs. 7 and 8, whereby the momentum of the rubbing-down device is restrained. Fig. 10 illustrates a top view of the device shown in Fig. 9. Fig. 11 illustrates a side view of the carriage which supports and carries the male die. Fig. 12 illustrates an end view of the parts shown in Fig. 11. Fig. 13 illustrates a vertical cross-section of the machine on the line $x\,x$ of Fig. 1. Fig. 14 illustrates details of parts hereinafter explained. Fig. 15 illustrates a view, partly in section and partly in elevation, taken on the line $y\,y$ of Fig. 1. Fig. 16 illustrates details of construction hereinafter explained. Fig. 17 illustrates a side view of the rear carriage which carries the roller, to which power is applied by the main driving-cam, as hereinafter described. Fig. 18 illustrates a front view of the parts shown in Fig. 17.

It will be observed that some of the figures are enlarged relative to the others. This is for the purposes of more clear explanation.

A is the frame of the machine. It is preferably, but not necessarily, made of metal, and is suitably fastened together in any preferred manner.

B is the main driving-shaft, upon which a gear C is keyed, which meshes into a cog-wheel D, which is fast upon a shaft E, from which shaft one of the large wheels F F on a shaft $f$ is driven by a suitable gearing $F^3$. One of these wheels F (shown best in Fig. 2) has upon a portion of its periphery cogs G, which during the revolution of the wheel engage with a gear-wheel H, keyed to a shaft I, upon which are also keyed two eccentrics J J, (see Figs. 1, 2, 7, 8, and 13,) which play in housings or straps K K, attached to the ends of pitmen L L by means of set-screws M M, as usual. The eccentrics are prevented from lateral escape from the shafts by a bolt or pin N N, (see Figs. 7 and 8,) entered about half and half in a groove in the edge of the eccentrics and in the inner periphery of the straps. The other end of the pitmen are pivoted to a sliding frame O at P, as shown, (see Figs. 2, 4, and 5,) and cause it to slide backward and forward on slideways Q, which are made in a yoke R, which crosses from side to side of the machine, bridging the dies. The frame O slides on ways S, made at its upper lateral edges. (See specially Figs. 2, 4, and 5.) The frame O has a hole in its central part in which rests a pillar T, (see Figs. 2, 4, and 5,) at the lower end whereof is attached a plate U, which is cut out at its forward end, making two horn-like forwardly-extending parts V V.

W is a roller set upon a shaft X, which is supported on two plates A' A', one on each side of the plate U. They are pivoted to the plate at B' B'. Thus the roller is capable of vertical adjustment, which is determined by set-screws C', which enter the thick part of the plate U, and the heads whereof engage with the upper edges of the plates A', thus adjusting the vertical position of the roller W, as desired.

D' is a friction device applied to the shaft I, whereby its momentum is controlled, so that as soon as the cogs on the wheel F have left the gear H there will be no movement of the slide-frame O until a re-engagement thereof. This friction device is best seen in Figs. 1, 9, and 10, and it comprises two arms E' E', pivoted to a small shaft F', journaled on the frame of the machine, the ends whereof encircle a collar or bushing G', which is fast on the shaft I, and are clamped about it by means of the screw H', which connects the free ends of the arms. Thus their friction on the collar G' will restrain the momentum of the parts, as stated.

Referring again to Figs. 2, 4, and 5, and especially to Fig. 2, I' is a rubber compression disk or cushion which abuts against the under side of the upper part of the frame O at O' (see Figs. 2 and 6) at one side and at the other side rests upon a washer J', which is given such vertical position, as desired, by being threaded to the pillar T. Thus the desired strength or resistance of the cushion I' to the upward movement of the pillar may be accurately adjusted. K' is another washer, also threaded on the pillar T, which rests against the under part of the frame O at $O^2$, (see Fig. 4,) thus limiting the downward movement of the pillar, carrying the roller W on its under side. These several devices, together with the set-screw C', afford the most perfect adjustment and determination of the pressure of the roller W.

Referring now to the forming-dies and the parts whereby they are operated, L' L' are blocks which carry the female or squeezing dies. (See Fig. 3.) They are pivoted at M' M', respectively, to the short arms of levers N' N', (see Fig. 1,) which are in turn pivoted at P' P' to the frame of the machine. At the ends of the long arms of these levers N' N' there are provided rubber or equivalent cushions Q' Q', which are clamped between a plate R' and the end of the lever. These plates are adjusted by a set-screw S', provided with a locking-nut $S^2$, as desired, thus determining the normal compression of the cushions Q'. The plates R' rest against suitable surfaces, such as the blocks T' T', fastened to the sides of the machine.

U' U' are the female or squeezing dies set in the opposed edges of the blocks L' L', being fastened therein by screws, as shown.

V' V' are cogs cut on the meeting faces of the blocks L' L' on the arcs of circles struck from the pivots M' M', whereby the die-carrying blocks L' L' are compelled to move in unison.

W is the male die. It is clamped in a recess in a sliding carriage X', which slides in suitable ways on the frame of the machine by means of adjusting-screws Y' $Y^2$ and a plate Z', held by screws $A^2 A^2$. Thus its position forwardly or rearwardly may be readily determined and it may be firmly held as adjusted. The size and contour of the sides and upper part of the male die is exactly that of interior of the desired shoe-counter, and the female dies each of them exactly conform to one half of the male die divided longitudinally.

$B^2 B^2 B^2 B^2$ are four rods, which are fastened at one end to the sliding carriage X', and at their other ends they are similarly fastened to another sliding carriage $C^2$, which also slides on suitable ways made on the frame of the machine.

$D^2$ is a roller which turns on a shaft $E^2$, journaled in the carriage $C^2$.

$F^2$ is a cam on the shaft $f$, which engages with the face of the roller $D^2$. The cam is so made that a portion of its periphery is concentric, as shown, whereby the roller $D^2$ and the carriage $C^2$, to which it is attached, are stationary during a part of the revolution of the cam.

$G^2$ is a strong spring attached to the frame of the machine at one end, as at $H^2$, and at the other to the under side of the carriage $C^2$ by means of a link $I^2$ and rod $I^3$. (See Figs. 2, 16, 17, and 18.)

$J^2 J^2$ are two springs attached at one end at $K^2 K^2$ (see Figs. 1, 2, and 3) to the rear faces of the die-blocks L' L', and at their other ends they are fastened to eyebolts $L^2 L^2$, (see Figs. 2 and 14,) which pass through holes $M^2$ made in pieces of metal $N^2$, which slide on the rods $B^2$. (See Figs. 2, 3, and 14.) The lower ends of the pieces $N^2$ are bifurcated to enable them to fit over the lower pair of the rods $B^2$, whereby they will be guided during their sliding movement and prevented from swiveling or turning on the upper pair of rods $B^2 B^2$.

$O^2$ are stops fastened to the rods $B^2 B^2$, &c., by set-screws, whereby their position may be adjusted, as desired.

The operation is as follows: The adjustment and timing of the machine being arranged to effect the several movements, as herein described, the operation commences when the male die is retracted from the female dies. The piece of leather or other substance from which the counter is to be made is first put into the machine immediately in front of the male die. Thereupon the shaft $f$ rotating, the cam $F^2$ comes in contact with the roller $D^2$. This moves the carriage $C^2$ rearwardly, which by means of the rods $B^2 B^2 B^2 B^2$ draws the carriage X', carrying the male die with it also forwardly toward the female dies U' U', and at about the time the male die has pushed the piece of leather or other material into the open jaws of the female dies the stops $O^2$ on the rods $B^2$, &c., have come into contact with the pieces of metal $N^2$ and carried them rearwardly with the rods $B^2$. This creates tension on the springs $J^2$, which swing the female dies more and more together with gradually-increasing power during the time that the male die is moving farther and farther within the female dies until finally they are practically closed upon the work before the male die runs fully home within them and exerts the great final squeezing action. This operation forms a material feature in my invention, because by it all the joints in the female dies are closed prior to the time that the leather or other goods reaches them. Thus there is no danger of nipping the material in such joints, and also there is a strong drawing or stretching action exerted on the leather or other goods by reason of the very considerable squeezing action of the dies upon it, while they yet have sliding movement one upon the other. By the time the male die is fully forced home between the female dies the roller $D^2$ is upon the concentric part of the cam $F^2$, and the parts are so held during the revolution of the cam until the "tumble-in" part thereof is reached at the end of the concentric portion, and during all this time the cogs G on the large wheel F are intermeshed with the gear-wheel H, which, acting through the eccentrics J and the straps K and pitmen L, causes the rubbing-down roller W, carried by the plate U, to sweep across the upwardly-projecting edge of the counter-blank, the horn-like ends V V of the plate U folding them inwardly during the forward movement of the plate, and they are firmly rolled down and compressed to shape by the roller W. The roller may be made to pass over the blank more than once, if desired, depending on the extent of the cogs on the wheel F and the size of the gear H, as now well understood. It will be observed that the entire operation of the machine is automatic; also that it can be adjusted in all possible respects, and also that the power exerted may be immense without danger of fracturing the machine, because of the relief-cushions for the rubbing-down roller W, and also those for the forming-dies at the long ends of the levers N' N', to which these dies are attached. By the time the cam $F^2$ has revolved to the tumble-in part the rubbing-down roller W has receded to its inoperative position by the complete rotation one or more times, as the case may be, of the eccentric, and then the spring $G^2$ pulls the carriages $C^2$ X' and the rods $B^2$ all forward again. This of course carries the male die rearwardly also, which pulls open the female dies, the spring $J^2 J^2$ being relaxed by the forward movement of the rods $B^2$. Thus the formed shoe-counter is released from the dies and drops from them into a suitable receptacle placed to receive it. The operation may then be repeated.

It will be observed that my female die has an internal contour similar to the external contour of the male die, and that it comprises two separable parts or squeezing-jaws which exert continual pressure on the counter during the forming operation, and that they are not mere rollers, such as have been sometimes heretofore used, which simply roll over the material forming the counter and do not remain in contact with it throughout. The forming effect of the rollers is much inferior to that of continuous swaging or squeezing jaws, not only so far as the shaping of the sides of the counter are concerned, but also the exactness in shape and the finish of the flange on the counter is very much better when the jaws are used than when rollers are used, because the jaws hold the material at all points in close contact with the interior male die while the flange is being pressed down.

I do not limit myself to the details of construction shown, since it will be obvious to those familiar with this art that certain alterations may be made therein, and that certain mechanical equivalents may be used for some of the parts shown by me and still the gist of my invention be employed.

I claim—

1. In a shoe-counter-forming machine, the combination, with a male die, of a female die formed of two separable parts geared together, said female die having its internal contour similar to the external contour of the male die, means, substantially as described, for moving the male die toward the female die, springs connected with the female die, which are put under tension by the movement of the male die and its coactive parts, whereby the female die is caused to close upon the male die before the latter has reached its ultimate position within the female die, substantially as set forth.

2. In a shoe-counter-forming machine, the combination, with a male die, of a female die formed of two separable parts geared together and having its internal contour similar to the external contour of the male die, mechanism for operating said dies, substantially as described, and a folding device and roller constructed and arranged to pass over the dies to fold down and press the edge of the counter, substantially as set forth.

3. The combination, in a counter-forming machine, of a two-part female die comprising two squeezing-jaws geared together, which conform to the shape of the male die, a male die adapted to enter between them, flange-folding and rubbing-down devices for the edges of the counter, and cushions for the folding and rubbing down devices, substantially as set forth.

4. The combination, in a counter-forming machine, with a male die and means for reciprocating the same, of a two-part female die comprising, essentially, two pivoted squeezing-jaws, springs connecting said jaws with the carriage of the male die and arranged to be put under tension by the inward movement of the said carriage as the male die passes between the squeezing-jaws, whereby the latter are closed upon the former by elastic pressure during the movement of the dies passing each other, substantially as set forth.

Signed at New York, in the county of New York and State of New York, this 12th day of October, A. D. 1889.

ALFRED BREDENBERG.

Witnesses:
 PHILLIPS ABBOTT,
 FREDERICK SMITH.